US008964766B2

(12) United States Patent
Shibata et al.

(10) Patent No.: US 8,964,766 B2
(45) Date of Patent: Feb. 24, 2015

(54) SESSION RELAY EQUIPMENT AND SESSION RELAY METHOD

(75) Inventors: Goh Shibata, Tokyo (JP); Atsushi Kawabata, Tokyo (JP); Yuko Asano, Tokyo (JP); Tutomu Murase, Tokyo (JP); Hideyuki Shimonishi, Tokyo (JP); Yohei Hasegawa, Tokyo (JP); Yasuhiro Yamazaki, Tokyo (JP)

(73) Assignee: NEC Corporation, Tokyo (JP)

( * ) Notice: Subject to any disclaimer, the term of this patent is extended or adjusted under 35 U.S.C. 154(b) by 2278 days.

(21) Appl. No.: 11/265,513

(22) Filed: Nov. 3, 2005

(65) Prior Publication Data

US 2006/0098667 A1 May 11, 2006

(30) Foreign Application Priority Data

Nov. 8, 2004 (JP) ................................. 2004-323855

(51) Int. Cl.
*H04L 12/28* (2006.01)
*H04L 12/66* (2006.01)
*H04J 1/16* (2006.01)

(52) U.S. Cl.
CPC ...................................... *H04L 12/66* (2013.01)
USPC .......................................... 370/401; 370/230

(58) Field of Classification Search
None
See application file for complete search history.

(56) References Cited

U.S. PATENT DOCUMENTS 5,941,988 A * 8/1999 Bhagwat et al. ................ 726/12
6,157,648 A * 12/2000 Voit et al. ...................... 370/401
2004/0199535 A1 * 10/2004 Zuk ................................ 707/102
2005/0117605 A1 * 6/2005 Yan et al. ....................... 370/469
2005/0141484 A1 * 6/2005 Rasanen ........................ 370/352

FOREIGN PATENT DOCUMENTS

| CN | 2003/10101427 | 10/2002 |
|---|---|---|
| JP | 11/163947 | 6/1999 |
| JP | 2001-308932 | 11/2001 |
| JP | 2003-8611 | 1/2003 |
| JP | 2004-104559 | 4/2004 |

OTHER PUBLICATIONS

Japanese Office Action with English Translation

* cited by examiner

*Primary Examiner* — Ayaz Sheikh
*Assistant Examiner* — Sori Aga
(74) *Attorney, Agent, or Firm* — Whitham Curtis Christofferson & Cook, PC

(57) ABSTRACT

A network environment capable of performing a smooth and comfortable TCP session operation is provided to a user. The session relay equipment includes a bridge portion which relays a session by which a sequence of packets are transmitted and received between terminals connected with each other via a network; a socket information table which has socket information containing (1) address information of the terminal and (2) protocol information used in the session, the socket information being associated with information on whether or not the session is to be terminated; and a service information table which has information on a communication service to be provided for each service provision unit, the communication service being identified based on predetermined information within a header of the packet. The bridge portion terminates the session and executes a communication service based on the information contained in the header of the packet and the socket information.

16 Claims, 9 Drawing Sheets

SESSION RELAY EQUIPMENT AND SESSION RELAY METHOD

BACKGROUND OF THE INVENTION

1. Field of the Invention

The present invention relates to equipment and a method for relaying a TCP (Transmission Control Protocol) session.

2. Description of the Related Art

In recent years, as the Internet is rapidly spreading, a variety of businesses and services using the Internet are being provided. Meanwhile, problems such as the lack of guarantee of communication quality, threats to security, and the growth of communication traffic, have arisen.

Currently, carriers, telecommunications firms and ISPs (Internet Service Providers) which provide service using the Internet each provide a network service using network equipment such as a switch and router which are based on TCP/IP (Internet Protocol). Using this infrastructure, they endeavor to increase the number of access points and broaden the line bandwidth, thereby spreading and improving the Internet.

However, while the Internet is spreading in this way, the needs of current users who demand advanced communication services cannot be satisfied. Since the current Internet is originally an Internet service of "Best Effort" (a communication service without controlling QoS (Quality of Service)), it is not suitable to be applied to businesses and "Rich Contents" on a full scale. Here, "Rich Contents" means contents which have the large amount of real time data, such as movies, radio programs, VoIP (Voice over Internet Protocol).

There has thus been proposed a communication network system capable of providing a variety of communication services to its users without degrading communication performance (refer to JP Laid-Open patent No. 2004-104559). In this communication network system, a provider server is installed on a provider communication network provided by the provider. In addition, service processing equipment is connected to a subscriber/user communication network to which the user terminal is connected. The provider server remotely controls a service processing program stored in the service processing equipment. Based on the rewritable service processing program stored in the service processing equipment, the equipment performs additional control on transfer data transmitted and received between a user terminal and the provider communication network. Herein, the rewritable service processing program is a program for performing transfer/discard of data, conversion of transmitting and receiving addresses, and control of communication quality, etc., on data transmitted and received via the provider communication network.

In the above described conventional communication network system, however, a high-speed communication service is not provided to its users. To perform a smooth and comfortable packet-transmitting/receiving operation by a TCP session on a user terminal, provision of a high-speed communication service is needed, and a process of selectively providing a variety of communication services such as QoS service and security service is further needed. However, a system capable of implementing such process has not been provided until now. In satisfying the needs of the current users demanding advanced communication services, such system is indispensable, and its implementation has been strongly desired. In the RFC 3135, Split Connections are specified, which is the technology for improving TCP performance. In a split connection TCP implementation, the proxy, which is located between end systems and/or proxies (these are called simply end systems), receives a packet from one end system and establishes a corresponding TCP session to another end system. In other words, the proxy terminates the packet from the one end system and originates a separate connection to another end system. This technology can improve the RTT.

However, in this split connection TCP implementation, all packets from the one end system are terminated by the proxy. And the proxy in the RFC 3135 does not have any socket information table or service information table, so the proxy can not selectively terminate the TCP packet from the one end system or provide any types of communication services.

SUMMARY OF THE INVENTION

An object of the present invention is to provide session relay equipment and a session relay method capable of providing a smooth and comfortable TCP session operation to a user.

To achieve the above object, session relay equipment of the present invention includes: a bridge portion which relays a session by which a sequence of packets are transmitted and received between terminals connected with each other via a network; a socket information table which has socket information containing (1) address information of the terminal and (2) protocol information used in the session, the socket information being associated with information on whether or not the session is to be terminated; and a service information table which has information on a communication service to be provided for each service provision unit, the communication service being identified based on predetermined information within a header of the packet. The bridge portion terminates the session and executes a communication service based on the information contained in the header of the packet and the socket information.

A session relay method of the present invention, executed by equipment which relays a session by which a sequence of packets are transmitted and received between terminals connected with each other via a network, said session relay method comprising: a step of acquiring header information of a received packet; a step of checking a socket information table which has socket information containing (1) address information of said terminal and (2) protocol information used in said session, said socket information being associated with information on whether or not said session is to be terminated; a step of terminating said session based on said header information and socket information; a step of checking a service information table which has information on a communication service to be provided for each service provision unit, said communication service being identified based on predetermined information within said header information; a step of reading from said service information table, information on said communication service to be provided; and a step of transmitting said packet to a receiving terminal by use of a new session and thereby implementing said communication service.

According to the present invention described above, once a session to which the received packet belongs is terminated, the packet is transmitted by a new session. Accordingly, RTT (Routed Trip Time) per interval of each session is shortened, whereby a high-speed communication service can be provided. Also, when a session is terminated, a service (QoS service, security service, etc.) to be provided, which is set in the service information table, is executed. Thus, in addition to provision of a high-speed communication service, a variety of communication services, such as QoS service and security service, can be selectively provided to the user.

According to the present invention, in addition to provision of a high-speed communication service, a variety of communication services, such as QoS service and security service, can be selectively provided. Accordingly, it is possible to provide to a user, a network environment which can perform a smooth and comfortable packet-transmitting/receiving operation in a TCP session.

BRIEF DESCRIPTION OF THE DRAWINGS

This above-mentioned and other objects, features and advantages of this invention will become more apparent by reference to the following detailed description of the invention taken in conjunction with the accompanying drawings, wherein.

DETAILED DESCRIPTION OF THE PREFERRED EMBODIMENT

An embodiment of the present invention will now be described with reference to the accompanying drawings.

Figure 1:
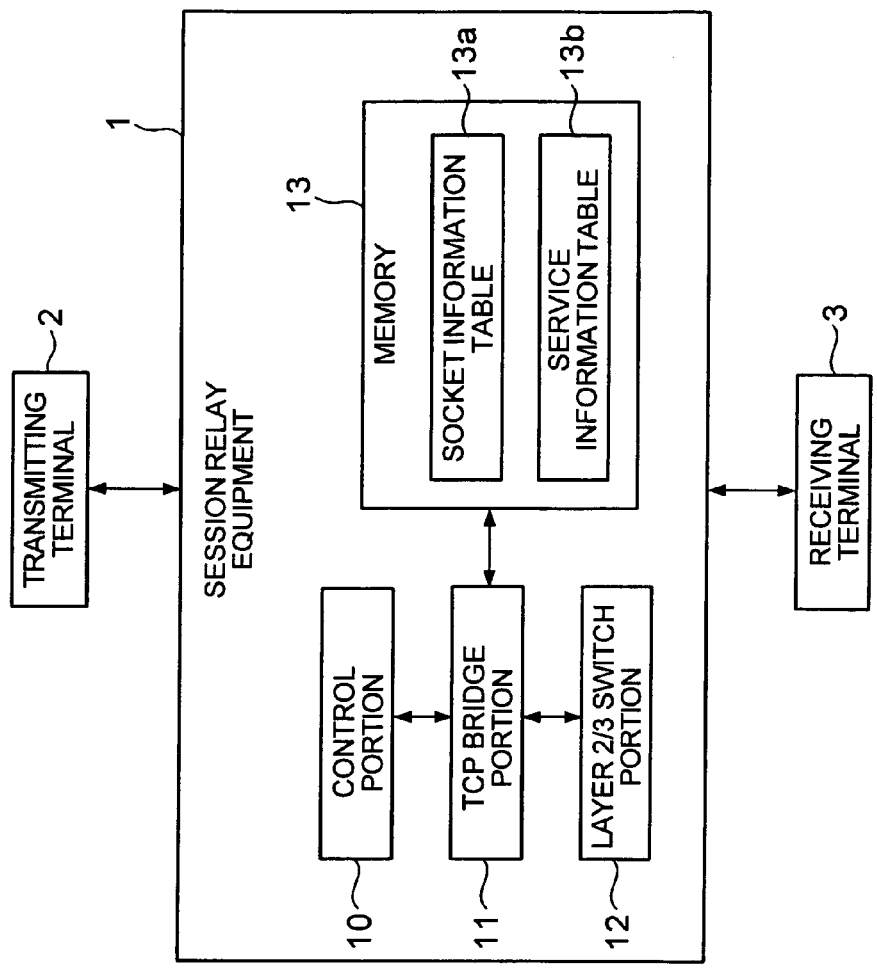
FIG. 1 is a block diagram showing a schematic configuration of session relay equipment according to one embodiment of the present invention.

FIG. 1 is a block diagram showing a schematic configuration of the session relay equipment according to one embodiment of the present invention. In the drawing, parts which are not directly necessary for the description of the present invention are omitted. Referring to FIG. 1, the session relay equipment 1 relays a session by which a sequence of packets are transmitted and received between a transmitting terminal 2 and a receiving terminal 3 connected with each other via a network (specifically, a line provided by a carrier, or a network provided by an ISP or a telecommunications firm). Herein, the word "session" means a TCP session (packet) based on TCP (Transport Control Protocol)/IP (Internet Protocol) being a standard protocol used in the Internet. Communication by TCP/IP is divided into Physical Layer (Layer 1), Data Link Layer (Layer 2), Internet Layer (Layer 3), Transport Layer (Layer 4), and Application Layer (Layer 7).

The main part of the session relay equipment 1 includes a control portion 10, a TCP bridge portion 11, a layer 2/3 switch portion 12, and a memory portion 13. A socket information table 13a and a service information table 13b are preliminarily stored in the memory 13.

In the socket information table 13a, there is stored socket information containing (1) the address information of a transmitting/receiving terminal on a network and (2) protocol information used in a session, in association with information on whether or not the session is to be terminated. Specifically, the socket information includes five items: source IP address, destination IP address, source port number, destination port number and fourth-layer (Layer 4) protocol number. In the socket information table 13a, the socket information is stored for each session (or for each user). The stored respective socket information of each session (or each user) has information (flag) on whether or not the session requires high-speed TCP session processing. The setting of this flag is performed by the administrator who manages the network in which the session relay equipment 1 is installed, each time when the user requests the high-speed communication service.

In the service information table 13b, information on communication service to be provided is described for each service provision unit, such as for each session or for each user. The communication services to be provided include QoS service, quality information monitoring service, and security service capable of protecting against Distributed Denial of Service (DDoS) attacks. Herein, "Distributed Denial of Service attack" means an attack in which many computers dispersed in plural networks simultaneously transmit packets to a particular server, making the communication path overflow and causing the functions to be stopped. In the service information table 13b, information (containing programs and data) needed to execute these communication services is stored for each service provision unit.

Service provision unit can be identified by use of at least one piece of the socket information. Specifically, information (programs and data) on a communication service to be provided is stored in the service information table 13b in association with at least one piece of the socket information. Other information within the packet header, such as MAC (Media Access Control) address and VLAN (Virtual Local Area Network) number, may be used as the information used for identifying a service provision unit. Alternatively, address information obtained by inquiring of DHCP (Dynamic Host Configuration Protocol) server, etc., maybe used as the information used for identifying a service provision unit. A communication service to be provided is set by the administrator or a management program which manages the network, each time when the user requests the communication service.

The Layer 2/3 processing portion 12 sends and receives a packet at the level of Data Link Layer (Layer 2) or at the level of Internet Protocol Layer (Layer 3). A packet sent from the transmitting terminal 2 is supplied to the TCP bridge portion 11 via the Layer 2/3 switch portion 12. Similarly, a packet sent from the receiving terminal 3 is supplied to the TCP bridge portion 11 via the Layer 2/3 switch portion 12.

The TCP bridge portion 11 controls relaying of a TCP session performed at the level of Transport Layer (Layer 4). The control of relaying a TCP session includes a process of terminating the TCP session by use of the socket information table 13a, and a process of executing a communication service with respect to the terminated session by use of the service information table 13b.

The control portion 10 controls the operation of each portion of the session relay equipment 1, and at the same time analyzes the result of each communication service executed by the TCP bridge portion 11 to thereby detect the communication state of the network. Specifically, the control portion 10 analyzes the execution result of a QoS service in an integrated manner and thereby perceives information on the entire network, such as communication traffic and route.

Before explaining the operation of the session relay equipment 1, the ways of opening and closing a TCP session are described.

Figure 2:
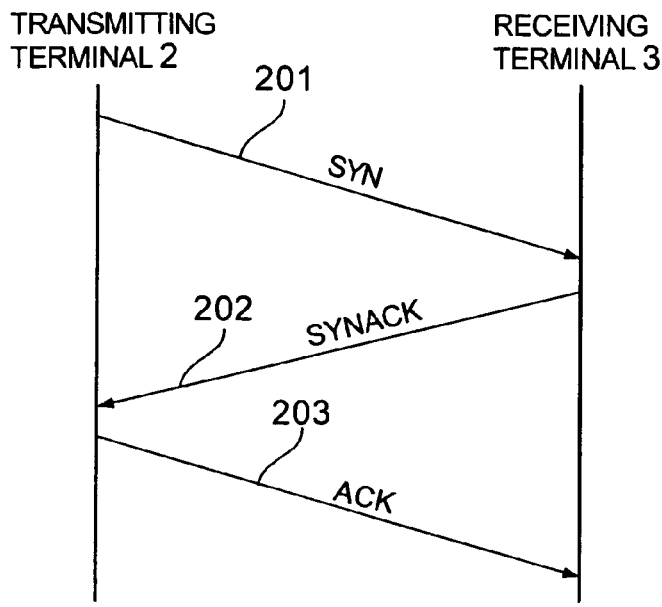
FIG. 2 is packet sequence for opening a TCP session between the transmitting terminal and the receiving terminal.

FIG. 2 is packet sequence for opening a TCP session between the transmitting terminal 2 and the receiving terminal 3. The transmitting terminal 2 sends a "SYN" (Synchronize) packet 201 to the receiving terminal 3. After receiving the "SYN" packet 201, the receiving terminal 3 sends a "SYNACK" (Synchronize Acknowledge) packet 202 back to the transmitting terminal 2. Moreover, after receiving the "SYNACK" packet 202, the transmitting terminal sends an "ACK" (Acknowledge) packet 203 to the receiving terminal. This procedure is called "three-way handshake". The TCP session is established through this procedure between the transmitting terminal 2 and receiving terminal 3.

After the TCP session is established, the transmitting terminal 2 and the receiving terminal 3 are able to exchange the data packets with each other.

Figure 3:
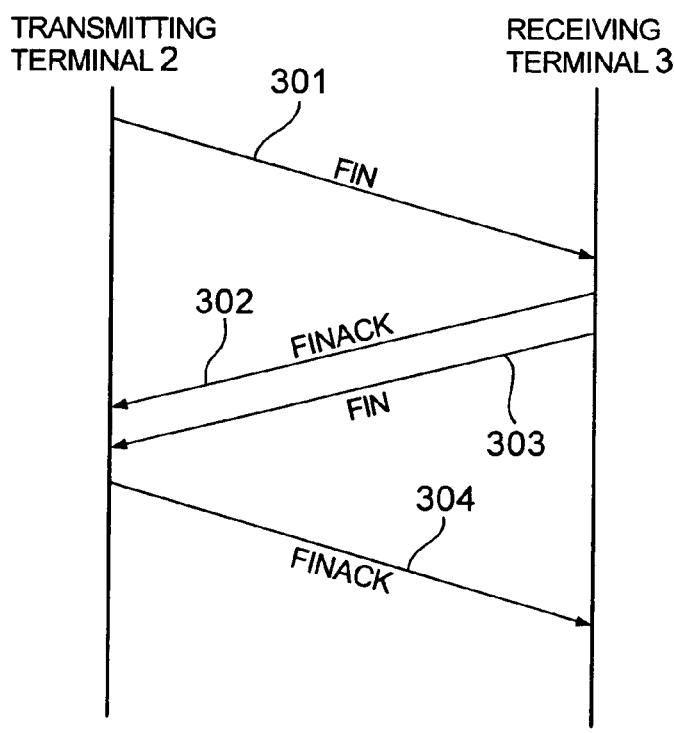
FIG. 3 is packet sequence for closing a TCP session between the transmitting terminal and the receiving terminal.

On the other hand FIG. 3 is packet sequence for closing a TCP session between the transmitting terminal 2 and the receiving terminal 3. The transmitting terminal 2 sends a "FIN" (Finish) packet 301 to the receiving terminal 3. After receiving the "FIN" packet 301, the receiving terminal 3 sends a "FINACK" (Finish Acknowledge) packet 302 and a "FIN" packet to the transmitting terminal 2. After receiving the "FINACK" packet 302 and the "FIN" packet 303, the transmitting terminal 2 sends a "FINACK" packet 304 to the receiving terminal 3.

The operation of the session relay equipment 1 will now be specifically described.

In the session relay equipment 1, processes of terminating a TCP session, executing a communication service and analyzing the execution result are performed. The operation will be described below for each process.

(1) Process of Terminating a TCP Session

Figure 4:
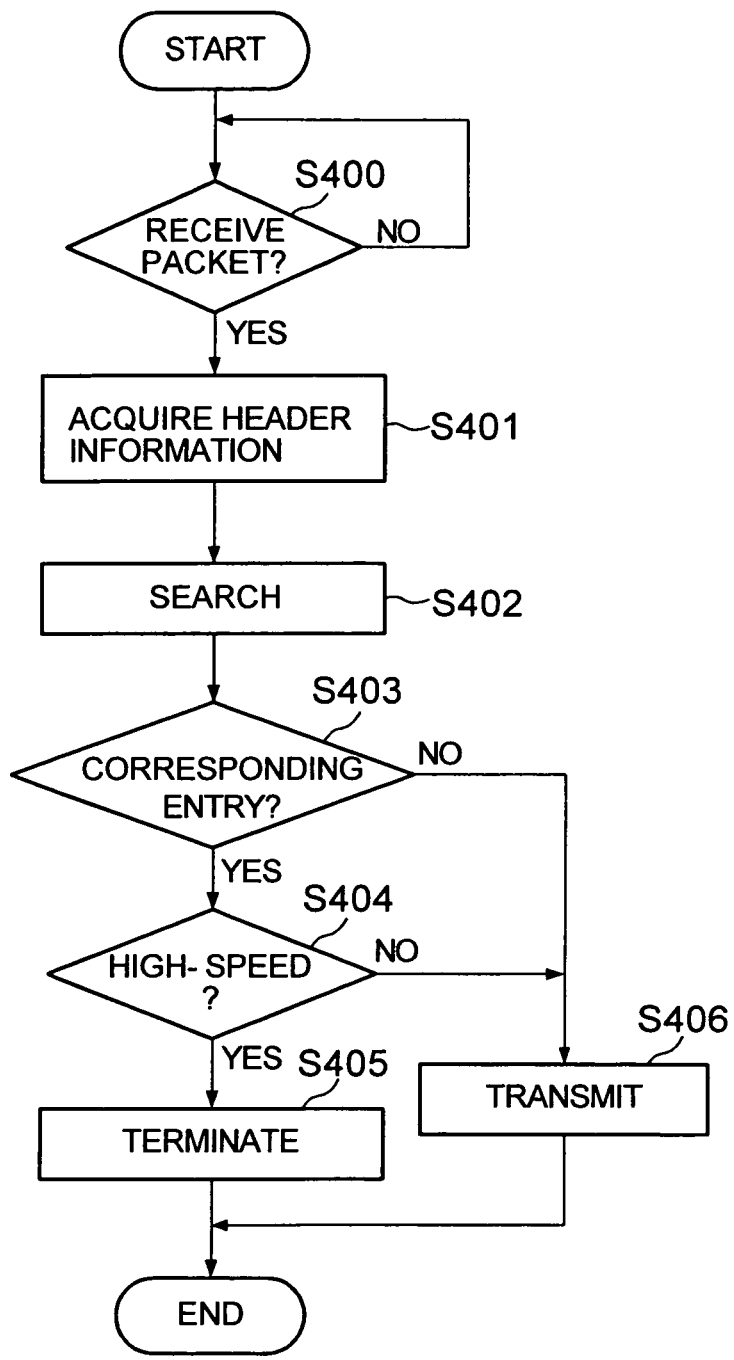
FIG. 4 is a flowchart showing one procedure of a process of terminating a TCP session, which is executed in the session relay equipment of FIG. 1.

FIG. 4 shows a procedure of the process of terminating a TCP session which is executed by the TCP bridge portion 11.

Firstly, it is determined whether or not a packet sent from the transmitting terminal 2 is received via the Layer 2/3 switch portion 12 (step 400). If a packet is received, information within the header of the received packet (source IP address, destination IP address, source port number, destination port number and fourth-layer protocol number, etc.) is acquired (step 401). Thereafter, the socket information table 13a is searched based on the acquired information within the header (step 402) for a corresponding entry in the table (step 403). If there is an entry having the same value as the information within the header in the socket information table 13a, successively it is checked whether or not the value (flag) set in the entry coincides with a value indicating a high-speed TCP processing session (step 404). If so, a process of terminating the session to which the received packet belongs is executed (step 405). If "No" in step 403 or 405, a process of allowing passage of the received packet is executed (step 406).

According to the above described process of terminating a TCP session, a session (or user) which is defined as a high-speed TCP processing session in the socket information table 13a is terminated. Accordingly, RTT (Routed Trip Time) is reduced, thereby providing a high-speed communication service.

RTT will now be briefly described. In a TCP session, a transmitting terminal 2 outputs a packet, and a receiving terminal 3 receives this packet and returns to the transmitting terminal 2, an "ACK" packet indicating reception of the packet. RTT is a period of time taken from when the transmitting terminal 2 outputs a packet to the receiving terminal 3 to when the transmitting terminal 2 receives an "ACK" packet from the receiving terminal 3. The shorter RTT, the shorter the period of time required for the TCP session, thus making it possible to provide a high-speed communication service. In the above described termination process of step 405, instead of the receiving terminal 3, the TCP bridge portion 11 sends an "ACK" packet to the transmitting terminal 2. Also, instead of the transmitting terminal 2, the TCP bridge portion 11 sends a packet to the receiving terminal 3. In this case, when seen from the transmitting terminal 2, the session relay equipment 1 is closer than the receiving terminal 3. Accordingly, when the session relay equipment 1 lies therebetween, RTT taken from when the transmitting terminal 2 sends a packet to when it receives a corresponding "ACK" packet is shortened relative to when the session relay equipment 1 does not lie therebetween. Similarly, RTT between the TCP bridge portion 11 and receiving terminal 3 is also shortened. Consequently, it becomes possible to provide a high-speed communication service.

When the process of allowing passage of a packet is performed at step 406, an ordinary TCP session (a session in which the session relay equipment 1 does not lie therebetween) is implemented.

Figure 5:
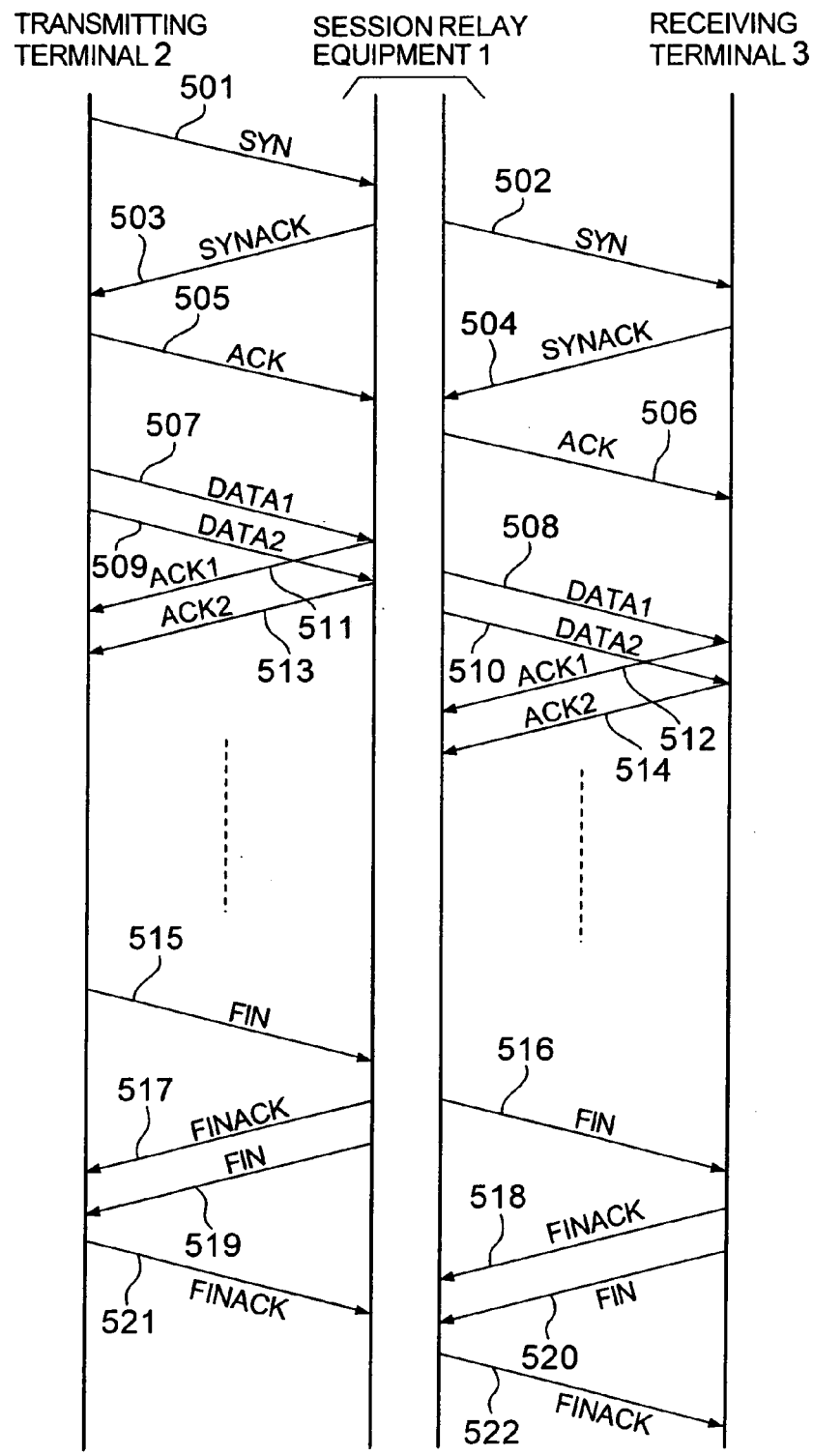
FIG. 5 is a sequence diagram explaining the packet stream between the transmitting terminal and receiving terminal.

FIG. 5 is a sequence diagram explaining the packet stream between the transmitting terminal 2 and receiving terminal 3 in the case that there is an entry in the socket information table 13a which corresponds to the information of the header of the "SYN" packet 501 received by the session relay equipment 1.

First, the transmitting terminal 2 sends a "SYN" packet 501 to the receiving terminal 3. The session relay equipment checks the information within the header of the received "SYN" packet 501. And before receiving a "SYNACK" packet from the receiving terminal 3, the session relay equipment 1 sends a "SYNACK" packet 503 to the transmitting terminal 2 and sends the "SYN" packet 501 to the receiving terminal 3. In FIG. 5, though the "SYN" packet sent from session relay equipment 1 is written as a "SYN" packet 502, the content of the "SYN" packet 502 is the same as that of the "SYN" packet 501.

In this case, the source address of the "SYNACK" packet 503 is replaced by the IP address of the receiving terminal 3, though the sender of the packet is not the receiving terminal 3 but the session relay equipment 1 which normally have a different IP address. Before receiving any packet from the receiving terminal 3, the session relay equipment 1 is able to know the IP address of the receiving terminal 3 by the destination address of the "SYN" packet 501 sent by the transmitting terminal 2. Similarly, the destination IP address of that packet is also replaced by the IP address of the transmitting terminal 1.

Then, the transmitting terminal 2 receives the "SYNACK" packet 503 and sends an "ACK" packet 505 to the session relay equipment 1. On the other hand, the receiving terminal 3 sends the "SYNACK" packet 504 and receives an "ACK" packet 506 sent by the session relay equipment 1.

After the above mentioned procedure, the transmitting terminal 2 begins to send the data packets such as the data packets 507 and 509 in FIG. 5. In FIG. 5, the other data packets after sending the data packets 507 and 509 are omitted in order to avoid redundancy, because the procedure is similar to that of sending data packets 507 and 509. Every data packet sent by the transmitting terminal 1 is terminated by the session relay equipment 1. And the session relay equipment 1 sends an "ACK" packet every after receiving a data packet. Consequently, the transmitting terminal 2 receives the "ACK" packets earlier than in the case that the "ACK" packets are sent by the receiving terminal 3 after receiving the data packets by the receiving terminal 3.

The session relay equipment 1 sends data packet 508 to the receiving terminal 3 after receiving the data packet 507, and also sends data packet 509 after receiving the data packet 509.

By the way, TCP specifies that the "ACK" packet should be sent after receiving the data packet. Therefore, the session relay equipment 1 sends an "ACK" packet 511 indicating reception of the packet after receiving the data packet 507, and also sends an "ACK" packet 513 after receiving the data packet 509. Similarly, the receiving terminal 3 sends "ACK" packets 512 and 514 after receiving the data packets 508 and 510 respectively.

At the closing of the TPC session, the procedure in FIG. 3 is executed. This procedure is also executed by the TCP bridge portion 11 as described in FIG. 5.

First, the transmitting terminal 1 sends a "FIN" packet 515 to the receiving terminal 3. This "FIN" packet is terminated by the session relay equipment 1, and the session relay equipment 1 sends a "FINACK" packet 517 and a "FIN" packet 519 to the transmitting terminal 2, and sends a "FIN" packet 516 to the receiving terminal 3. After receiving the "FINACK" packet 517 and the "FIN" packet 519, the transmitting terminal 2 sends to the receiving terminal 3 a "FINACK" packet which is also terminated by the session relay equipment 1.

On the other hand, after receiving the "FIN" packet 516, the receiving terminal 3 sends a "FINACK" packet 518 and a "FIN" packet 520 to the transmitting terminal 2. After terminating these two packets, the session relay equipment 1 sends a "FINACK" packet to the receiving terminal 3.

In FIG. 5, the session relay equipment 1 sends a "SYN-ACK" packet 503 to the transmitting terminal 2 before receiving a "SYNACK" packet 504. According to the procedure in FIG. 5, if the receiving terminal 3 were not active because of, for example, being turned off or being broken down, the transmitting terminal 2 would continue to send data packets to the receiving terminal 3, because the session relay equipment 1 sends packets such as "SYNACK" or "ACK" packets to the transmitting terminal in place of the receiving terminal 3 and the transmitting terminal 2 can not know that the receiving terminal 3 is not active. To avoid this inconvenience, the session relay equipment 1 may send nothing to the transmitting terminal 2 if the session relay equipment 1 does not receive any response from the receiving terminal 3 within the predetermined period, for example 10 seconds. Consequently, the sending terminal 2 is able to know that the receiving terminal 3 is not active, and then close the TCP session.

Figure 6:
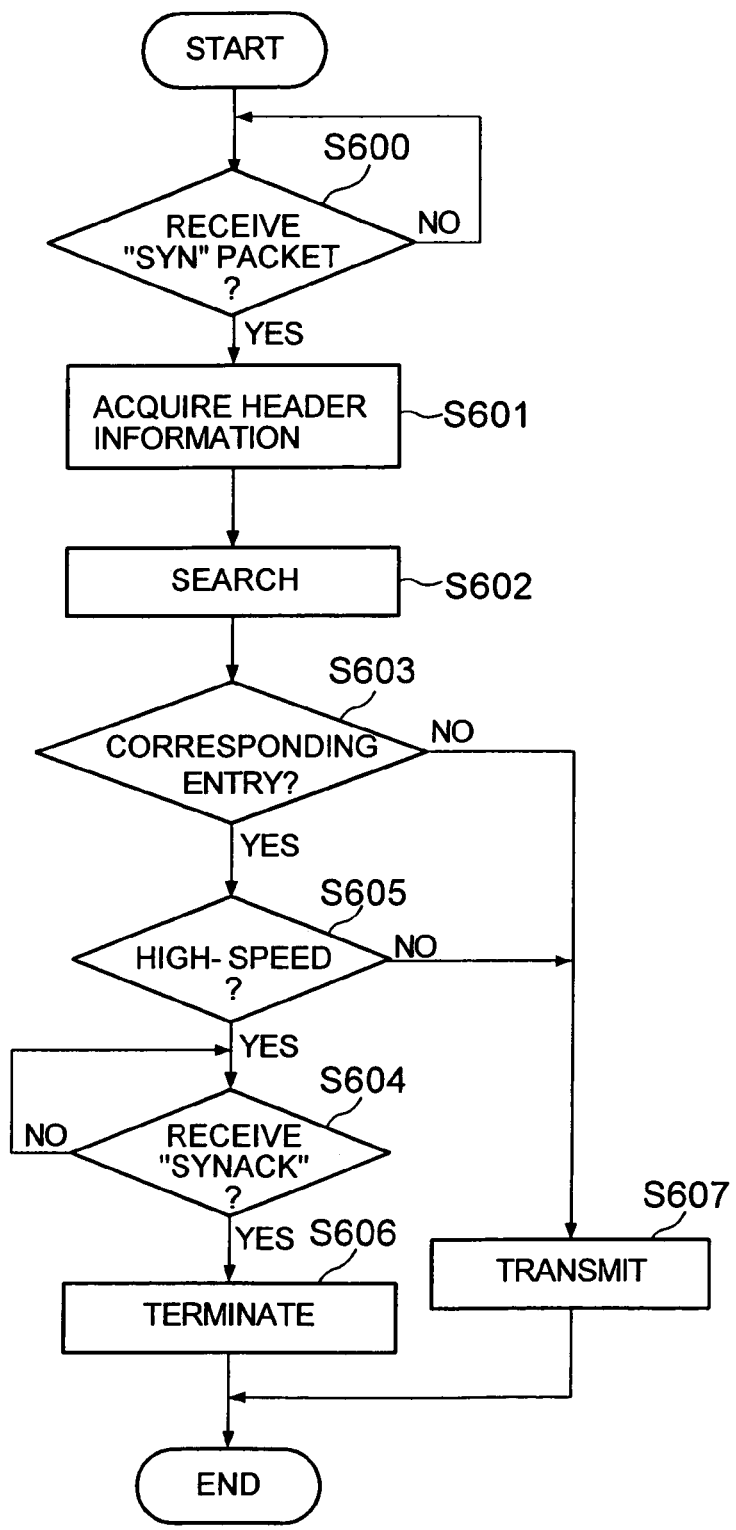
FIG. 6 is a procedure of the process of terminating a TCP session which is executed by the TCP bridge portion.

FIG. 6 shows another procedure of the process of terminating a TCP session which is executed by the TCP bridge portion 11. This procedure is similar to that of FIG. 4, but it is different. First, the step 604 is implemented in the process of FIG. 6. Second, the process of FIG. 5 is executed at the beginning of the TCP session, particularly, for the "SYN" packet from the transmitting terminal 2.

Firstly, it is determined whether or not a "SYN" packet sent from the transmitting terminal 2 is received via the Layer 2/3 switch portion 12 (step 600). If the "SYN" packet is received, information within the header of the received packet (source IP address, destination IP address, source port number, destination port number and fourth-layer protocol number, etc.) is acquired (step 601). Thereafter, the socket information table 13a is searched based on the acquired information within the header (step 602) for a corresponding entry in the table (step 603). If there is an entry having the same value as the information within the header in the socket information table 13a, successively it is checked whether or not the value (flag) set in the entry coincides with a value indicating a high-speed TCP processing session (step 605). If "YES", it is checked whether or not the "SYNACK" packet from the receiving terminal 3 is received (step 604). If no, the TCP bridge portion 11 repeats the process of checking (step 605). If "YES" at the step 604, a process of terminating the session to which the received packet belongs is executed (step 606). On the other hand, if "No" in step 603 or 605, a process of allowing passage of the received packet is executed (step 607).

In FIG. 6, if the TCP bridge portion 11 fall into infinite loop, unless receiving the "SYNACK" packet from the receiving terminal 3. The TCP bridge portion 11 may terminate the infinite loop if the session relay equipment 1 does not receive the "SYNACK" packet within the predetermined period, for example, 10 seconds.

Figure 7:
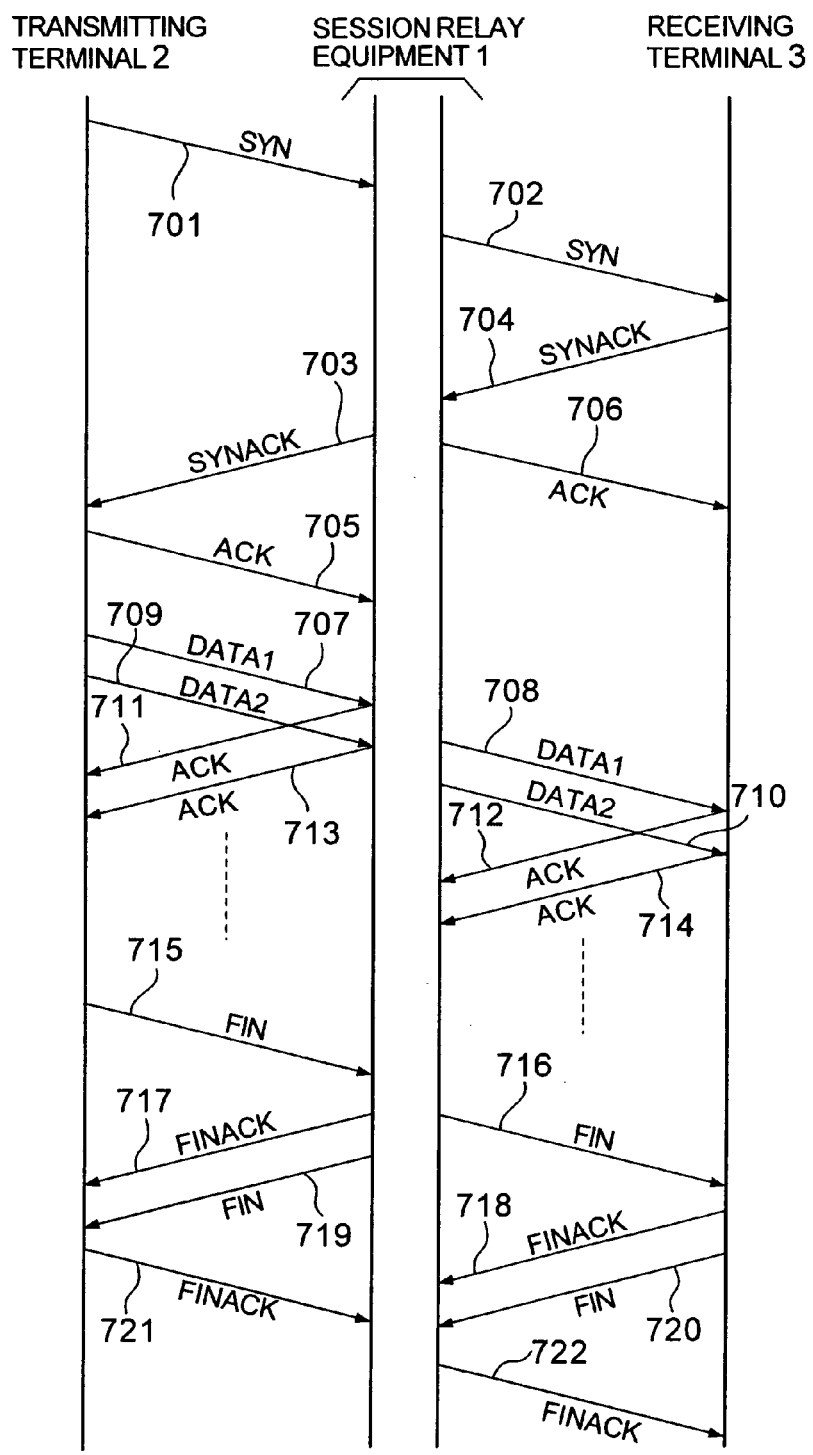
FIG. 7 is a sequence diagram explaining the packet stream between the transmitting terminal and receiving terminal.

FIG. 7 is a sequence diagram similar to the diagram of FIG. 5. The difference between two sequence diagrams is the beginning process in which "SYN", "SYNACK" and "ACK" packets are transmitted and received. Only the beginning process is described below in order to avoid redundancy, because other process after establishing the TCP session is similar to the process of FIG. 5.

As described in FIG. 6, the session relay equipment 1 does not send a "SYNACK" packet 703 unless it receives the "SYNACK" packet 704 from the receiving terminal 3. Therefore, it does not happen that the transmitting terminal 2 continues to send data packets when the receiving terminal 3 is not active.

(2) Process of Executing a Communication Service

When a process of terminating the session to which the received packet belongs is performed in the above described TCP session termination process, the TCP bridge portion 11 outputs the received packet to the receiving terminal 3 by use of a new TCP session, thereby performing a process of executing a communication service. In this process of executing a communication service, firstly the TCP bridge portion 11 acquires information within the header of the received packet (source IP address, destination IP address, source port number, destination port number and fourth-layer protocol number, etc.) Thereafter, the TCP bridge portion 11 reads from the service information table 13b, information on a communication service to be executed, based on the predetermined information contained in the acquired information within the header, and then executes the communication service. Herein, predetermined information means information by which the service provision unit can be identified, e.g., at least one piece of the socket information.

Figure 8:
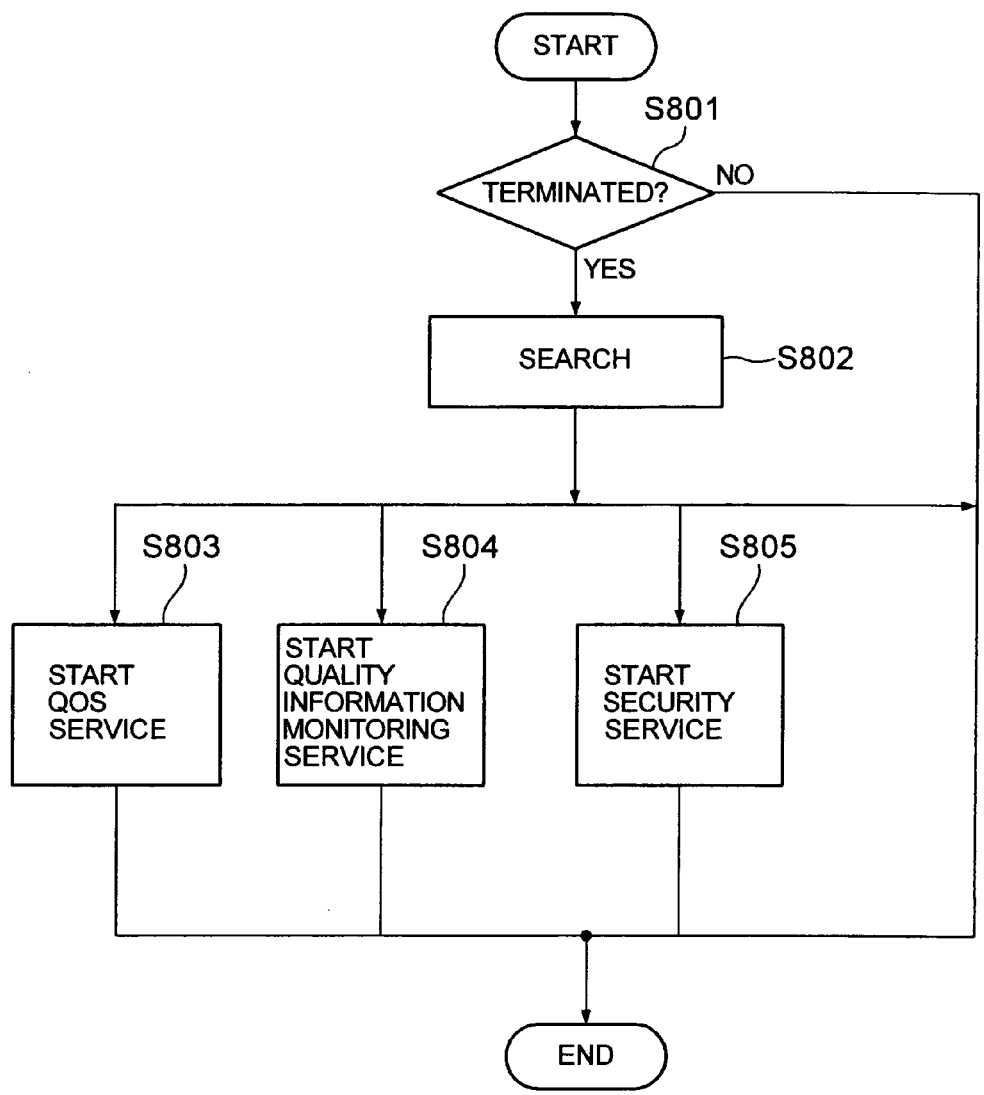
FIG. 8 is a process of selecting the communication services executed by the TPC bridge portion.

FIG. 8 shows the process of selecting the communication services executed by the TPC bridge portion 11. This process is executed after the process described FIG. 4 or FIG. 6.

Firstly, it is checked whether or not the packet between the transmitting terminal 2 and the receiving terminal 3 is supposed to be terminated at the session relay equipment 1. If "NO", this process ends. On the other hand, if "YES", the TCP bridge portion 11 searches ("checks") the service information table 13b for the information corresponding to the relevant communication service (S802). The communication service to be provided is read from the service information table. If a QoS service is selected as a communication service, the TCP bridge portion 11 starts a necessary procedure for the QoS service (step 803). If a quality information monitoring service is selected as a communication service, the TCP bridge portion 11 starts a necessary procedure for the quality information monitoring service (step 804). If a security service is selected as a communication service, the TCP bridge portion 11 starts a necessary procedure for the security service (step 805). If the TCP bridge portion 11 does not find the corresponding communication service, the TCP bridge portion 11 exits the process of FIG. 8.

An exemplary operation of QoS service, quality information monitoring service, and security service performed as a communication service will be described below.

(2a) QoS Service

TCP, and its derivatives, is generally one kind of protocol. However, it is also possible to purposely design a protocol having a different behavior. In a QoS service, when a transmitting terminal sends a packet to a receiving terminal by use of a new session, a TCP having a different behavior is appropriately used according to the quality condition to be provided. Thus, the information setting bandwidth, other quality level and the protocol to be used is stored in the service information table 13b as the information on QoS service. When a redundant connection service using plural lines is provided, the information on each line is stored as the information on QoS service in the service information table 13b. When the communication service to be executed is a QoS service, the TCP bridge portion 11 reads information necessary for the execution of the QoS service from the service information table 13b. The information necessary for the execution of the QoS service is the information such as the information on protocol to be used, the information for setting bandwidth and the information on quality of the line. Thereafter, the TCP bridge portion 11 executes the QoS service based on the information thus read. In this way, the quality control of user traffic by the QoS service is performed.

By virtue of the above described quality control of user traffic by a QoS service, it is possible to allow a communication network system to be applied to businesses and "Rich Contents" on a full scale.

(2b) Quality Information Monitoring Service

Quality information monitoring service performs quality measurement for each session. Accordingly, in the service information table 13b, the information on each measurement item, such as transfer delay, throughput, discard ratio, and response time, is stored as the information on quality information monitoring service. When the communication service to be executed is a quality information monitoring service, the TCP bridge portion 11 reads the information on measurement items from the service information table 13b, and performs quality measurement based on the measurement items thus read.

In a case where a warning is to be issued when the TCP bridge portion 11 detects quality degradation, the threshold value of quality degradation and the content of warning process are set for each measurement item stored in the service information table 13b. The TCP bridge portion 11 compares the execution result of measurement with the threshold value stored in the service information table 13b. When the execution result exceeds the threshold value, the warning process preliminarily set is executed. In the warning process, a warning is issued to a user terminal (in this example, a transmitting terminal 2 or a receiving terminal 3) or to the network administrator. A different warning process can be set for each measurement item. The warning process may be realized by sending a message such as an e-mail to a user terminal or to the network administrator, or by beeping, etc.

In the existing Internet, a unique network policy is established for each ISP, so the method of dealing with traffic and the routing process are not uniform. Consequently, it is difficult to provide a service based on a common SLA (Service Level Agreement), and to perceive information (traffic, route, etc.) on the entire network. If the above described quality control of user traffic by a QoS service and the quality measurement by a quality information monitoring service are performed, even when the method of dealing with traffic and the routing process are not uniform, a service provision based on a common SLA is possible.

(2c) Security Service

In the case of a security service, information for identifying an attacker or a user who consumes a large quantity of network resources (hereinafter, attacker identification information) and the method of dealing with the attacker are stored as the information on security service in the service information table 13b. The attacker identification information includes the number of session opening requests per unit time, the used bandwidth per unit time, and the IP address and port number presumed to be used by an attacker (hereinafter, an "attacker" includes a user who consumes a large quantity of network resources). In the method of dealing with an attacker, there are included the information on whether or not the connection is terminated, and information such as a protocol to be used and a maximum bandwidth when the connection is permitted. When the communication service to be executed is a security service, the TCP bridge portion 11 checks based on the information within the header of the received packet, the number of session opening requests per unit time, the used bandwidth per unit time, and the IP address and port number. If the check result coincides with the attacker identification information stored in the service information table 13b, then the TCP bridge portion 11 determines that it is a packet received from an attacker, and executes against the session relating to the received packet, a process based on the method of dealing with the attacker stored in the service information table 13b.

Attacker identification information may be set by the network administrator or a network management program, or may alternatively be dynamically set from the results of the service execution portion monitoring the number of opened sessions and the used bandwidth per unit time for each of specific IP addresses and port numbers.

By virtue of the above described security service, it is possible to protect against a DDoS attack.

(3) Process of Analyzing the Execution Result of Communication Service

When the above QoS service is executed, a process of analyzing the execution result of communication service is performed by the control portion 10. In this process of analyzing the execution result of communication service, the TCP bridge portion 11 supplies the result of quality control by the QoS service to the control portion 10. Based on the result of quality control from the TCP bridge portion 11, the control portion 10 analyzes the execution result of communication service. Thereafter, based on the analysis result, the control portion 10 perceives the information (traffic, route, etc.) on the entire network in which the session relay equipment 1 is installed.

The session relay equipment 1 described above is applicable to the existing networks constituting the Internet. An exemplary application of the session relay equipment 1 will be described below.

(Exemplary Application)

Figure 9:
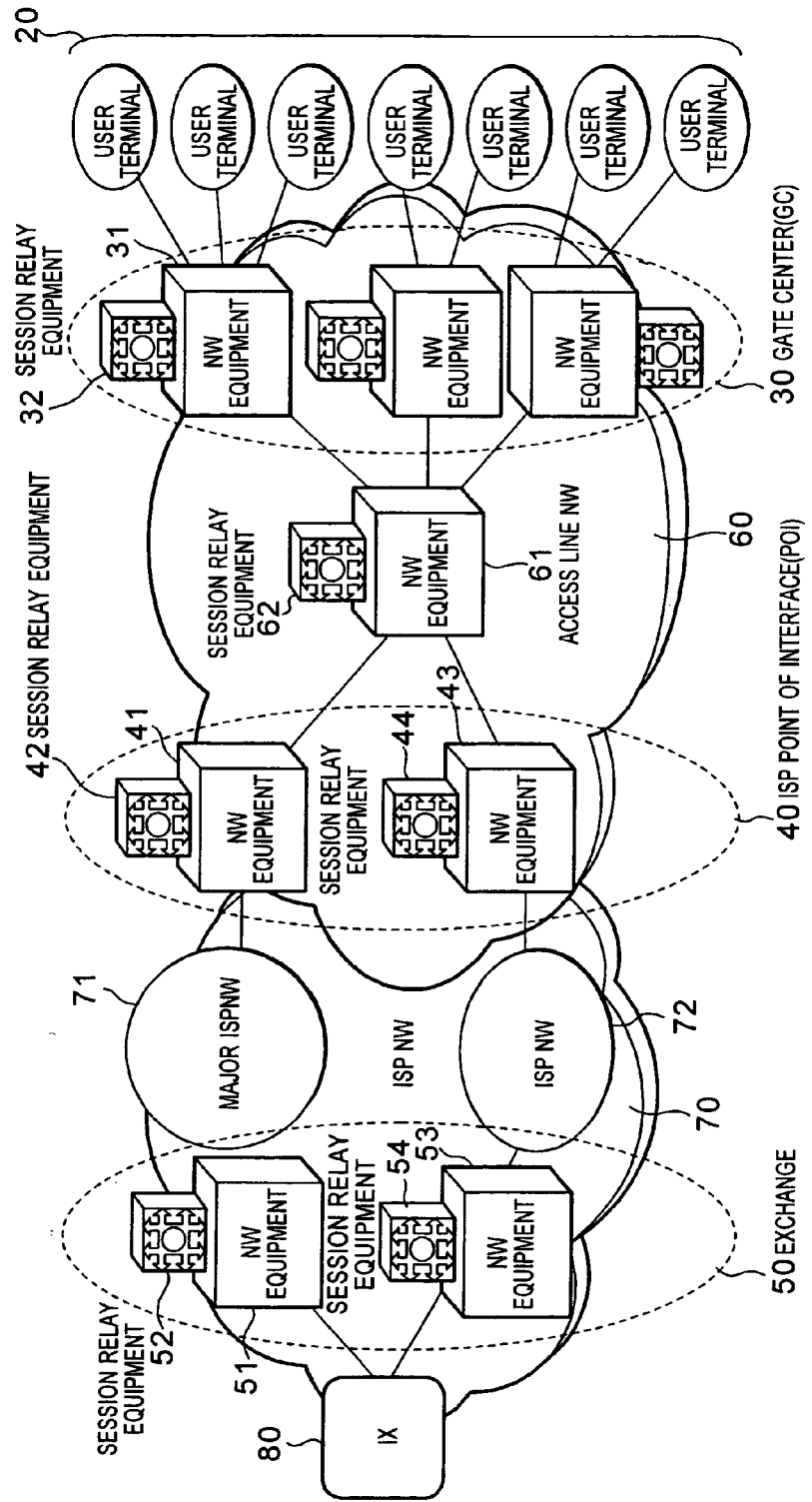
FIG. 9 is a block diagram showing an exemplary communication system to which the inventive session relay equipment is applied.

FIG. 9 shows an exemplary communication system to which the inventive session relay equipment is applied. The communication system includes an access line network (NW) 60 and an ISP network (NW) 70. The ISPNW 70 includes a major ISPNW 71 and an ISPNW 72. In the access line NW 60, there are installed a Gate Center (GC) 30 which accommodates plural user terminals 20, and an ISP Point of Interface (POI) 40 having connected thereto the major ISPNW 71 and the ISPNW 72. The major ISPNW 71 and the ISPNW 72 are each connected to an IX (Internet exchange) 80 via an exchange 50. The IX 80 is a Point of Interface using MPLS (Multi Protocol Label Switching) being a high-speed packet transfer technique.

The Gate Center 30 includes plural pieces of network equipment 31 each connected to user terminals 20. The session relay equipment 32 is mounted in network equipment 31. The ISP Point of Interface 40 includes network equipment 41 being connected thereto the major ISPNW 71, and network equipment 43 being connected thereto the ISPNW 72. The session relay equipment 42 and 44 are mounted in the network equipment 41 and 43, respectively. The network equipment 41 and 43 are connected to network equipment 31 via network equipment 61. The session relay equipment 62 is mounted in the network equipment 61.

The exchange 50 includes network equipment 51 connected to the major ISPNW 71, and network equipment 53 connected to the ISPNW 72. Session relay equipment 52 and 54 are mounted in the network equipment 51 and 53, respectively. The network equipment 51 and 53 are each connected to the IX 80.

The session relay equipment 32, 42, 44, 52, 54 and 62 each have the same configuration as the session relay equipment shown in FIG. 1. In the service information table of session relay equipment, a communication service to be provided is described for each user having a service subscription.

In the communication system according to the present embodiment, a business or an ordinary user using the Internet accesses an access line network 60 provided by a carrier, by use of a user terminal 20. In a Gate Center 30 of the access line network 60, session relay equipment 32 mounted in a network equipment 31 terminates a particular session at the TCP level, and at the same time executes a communication service preliminarily specified with respect to the terminated session and analyzes the execution result. In this way, a high-speed communication service with reduced RTT is provided, and at the same time a variety of communication services, such as QoS service, quality information monitoring service and security service, are provided. The similar process is also executed in the session relay equipments 42, 44, 52, 54 and 62, whereby the user terminal 20 and IX 80 are connected to each other.

Figure 10:
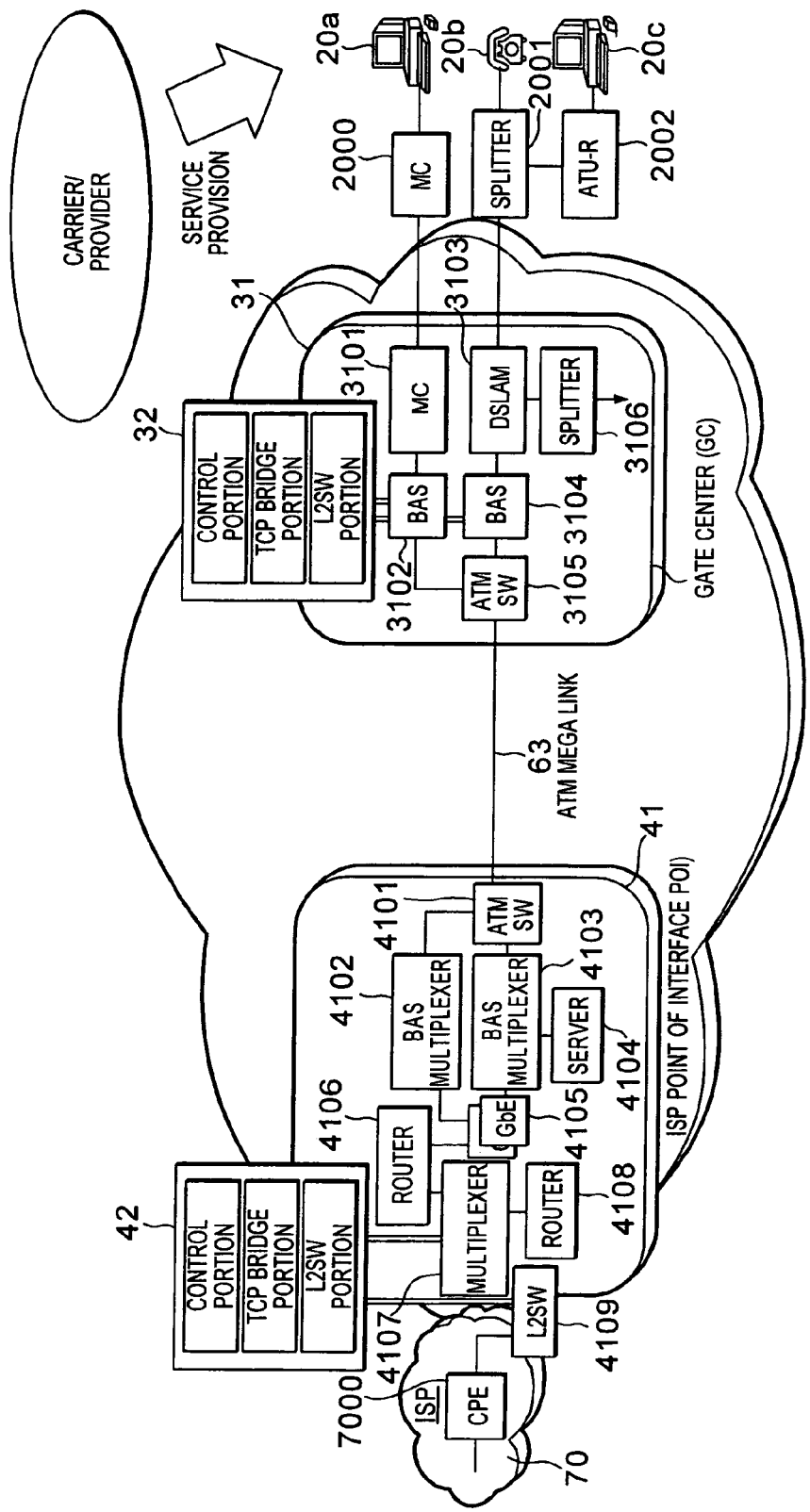
FIG. 10 is a block diagram showing an illustrative example of the communication system to which the inventive session relay equipment is applied.

FIG. 10 is a specific example of the communication system shown in FIG. 9. In this communication system, network equipment 31 is connected thereto user terminals 20a to 20c. Network equipment 41 is connected via a Layer 2 switch 4109 to CPE (Customer Premises Equipment) 7000 such as a router and a modem installed in an ISPNW 70. The network equipment 31 and the network equipment 41 are connected with each other via an ATM mega link 63.

The network equipment 31 includes session relay equipment 32 and a BAS (Broadband Access Server) 3102 which are connected to each other. The BAS 3102 authenticates a connection request from a user, makes a connection with a partner ISP or a higher rank line, performs a priority control, and performs bandwidth management. Connected to the BAS 3102 are a MC (Media Converter) 3101 having a user terminal 20a connected thereto via a MC 2000, and in addition, another BAS 3104 having connected thereto a DSLAM (Digital Subscriber Line Access Multiplexer) 3103. The BASs 3102 and 3104 are each connected to an ATM switch 3105.

The DSLAM 3103, which is a concentrator which works as a bridge to the backbone, is connected to an exchange via a splitter 3106. Also connected to the DSLAM 3103 is a splitter 2001 having connected thereto a user terminal 20b. The splitter 2001 is connected to a user terminal 20c via an ATU-R (ADSL Transceiver Unit, Remote terminal end) 2002. The ATU-R 2002 is an ADSL (Asymmetric Digital Subscriber Line) modem.

The network equipment 41 includes a multiplexer 4107 having connected thereto session relay equipment 42. The multiplexer 4107 aggregates routers (or Layer 3 switches) 4106 and 4108 installed on a per-ISP basis. BAS multiplexers 4102 and 4103 for aggregating the BASs installed for each Gate Center are each connected to the router 4106 via a GbE (Gigabit Ethernet) switch 4105. A server 4104 for specifying the destination (termination) of Layer 2 TP tunnel generated by the BAS of each Gate Center is connected to the BAS multiplexer 4103. The server 4104 is a Radius server.

The BAS multiplexers 4102 and 4103 are each connected to an ATM switch 4101. The ATM switch 4101 is connected to an ATM switch 3105 of the network equipment 31 via the ATM mega link 63.

In this communication system, carriers, ISPs or the like provides to their users, QoS service, high-speed TCP service, security service and traceability service at the TCP level. In the network equipment 31 of the Gate Center, the session relay equipment 32 is incorporated in equipment for terminating a PPPoE (PPP over Ethernet), such as BAS, without replacing the whole equipment.

In the session relay equipment 32, a session of high-speed session processing from among TCP sessions (packets) coming from each of the user terminals 20a to 20c is terminated. Then, the session relay equipment 32 executes a communication service preliminarily specified by the user with respect to the terminated session. By executing this communication service, for example, it becomes possible to maintain the window (buffer) information and RTT specified by the information within the header of an "ACK" packet and also becomes possible to stabilize the window control in the transmitting side. Therefore, it also becomes possible to maintain a constant performance (constant transfer rate). Also, by monitoring the transfer state on a per-TCP session basis to collect and manage the information on transfer quality, such as RTT, buffer and transfer rate, it becomes possible to provide a TCP traceability function.

In FIG. 9, session relay equipment such as 62, 42, 44, 52 or 54 may also terminate the TCP session by using the method described above. For example, in the case that the receiving terminal is connected to the IX 80 and communicates with one of the user terminals 20, if there is other session relay equipment terminates the TCP session and is located between the session relay equipment 32 and IX 80, RRT between the one of the user terminals 20 and the receiving terminal is shorter than that in the case that there is no session relay equipment other that 32 which terminates the TCP session.

Which session relay equipment terminates or does not terminate the TCP session may be decided by the network operators or the administrator of the each network equipment.

As described above, with the communication system having applied thereto the session relay equipment of the present invention, QoS service, high-speed communication service, and security service on a network, which have hitherto be provided only to business users by use of VPN (Virtual Private Network) etc., can also be used by ordinary users. Accordingly, it becomes possible to provide a more comfortable environment for the users to use the Internet.

In addition, it becomes possible for businesses, such as carriers and ISPs, to handle "Rich Contents" by providing the QoS function. Consequently, communication services, which have hitherto been provided only to business users, can also be provided to ordinary users.

Also, since a method can be employed to introduce the session relay equipment of the present invention, it can be applied to the existing system easily and at low cost. In addition, since complex network design is not needed, a smooth implementation is possible.

The previous description is of a preferred embodiment and an exemplary application of the present invention, and appropriate modifications to the configuration and operation are possible.

The system (network) to which the session relay equipment of the present invention is applicable is not limited to one shown in the drawings. For example, the session relay equipment of the present invention is applicable to various networks including the access line services provided by NTT, such as FLET'S, WideLAN and dark fiber, and rural IP networks provided by local governments.

What is claimed is:

1. A session relay equipment comprising:
a bridge portion, implementing a bridge portion processing session protocol, which relays a TCP session by which a sequence of packets are transmitted and received between terminals connected with each other via a network;
a socket information table which has socket information containing address information of one of said terminals and protocol information used in said TCP session, said socket information being associated with information on whether or not said TCP session is to be terminated; and
a service information table which has information on a communication service being identified based on predetermined information within a header of said packet,
wherein said bridge portion terminates said TCP session, dividing said TCP session into two TCP sessions between terminals and the session relay equipment, and executes a communication service based on said information contained in said header of said packet and said socket information, and
wherein the bridge portion processing session protocol includes sending ACK (Acknowledge) packets of the transport protocol.

2. The session relay equipment according to claim 1, wherein said predetermined information includes at least one piece of said socket information.

3. The session relay equipment according to claim 1, wherein said communication service to be provided includes a service for guaranteeing or improving a communication quality of said network, and protocol information and quality information each used when executing said service are stored in said service information table.

4. The session relay equipment according to claim 3, wherein said quality information includes at least one of information on bandwidth, priority, transfer delay and packet discard ratio.

5. The session relay equipment according to claim 3, wherein said communication service to be provided further includes a service for monitoring said communication quality of said network, and information on said communication quality measured when executing said service is stored in said service information table.

6. The session relay equipment according to claim 1, wherein said communication service to be provided includes at least one of a service for protecting against an attack from an attacker, and information for identifying said attack and information on a process against said attack are stored in said service information table.

7. The session relay equipment according to claim 1, further comprising a control portion which analyzes an execution result of said communication service to detect a communication state of said network.

8. A session relay method executed by equipment which relays a session by which a sequence of packets are transmitted and received between terminals connected with each other via a network, said session relay method comprising:
a step of acquiring header information of a received packet;
a step of checking a socket information table which has socket information containing address information of one of said terminals and protocol information used in said session, said socket information being associated with information on whether or not said session is to be terminated;
if said session is to be terminated, a step of terminating said session based on said header information and socket information;
a step of checking a service information table which has information on a communication service to be provided for each service provision unit being identified based on predetermined information within said header information;
a step of reading from said service information table, information on said communication service to be provided; and
a step of transmitting said packet to a receiving terminal by use of a new session and thereby implementing said communication service;
wherein the step of terminating said session divides the session into two TCP sessions between terminals and the session relay equipment, executes a communication service based on said information contained in said header of said packet and said socket information, and implements a processing session protocol that includes sending ACK (Acknowledge) packets of the transport protocol.

9. The session relay method according to claim 8, wherein said predetermined information corresponds to at least one piece of said socket information.

10. The session relay method according to claim 8, wherein said communication service to be provided includes a service for guaranteeing or improving a communication quality of said network.

11. The session relay method according to claim 10, wherein said communication service to be provided further includes a service for monitoring said communication quality of said network.

12. The session relay method according to claim 8, wherein said communication service to be provided includes a service for protecting against an attack from an attacker.

13. The session relay method according to claim 8, further comprising a step which analyzes said execution result of said communication service to detect a communication state of said network.

14. The session relay method according to claim 8 wherein said communication service to be provided includes rich contents.

15. The session relay method according to claim 14 wherein said rich contents are selected from the group consisting of movies, radio programs, and VoIP (voice over internet protocol).

16. A communications system of device comprising:
at least one transmitter or receiver; and
session relay equipment comprising
a) a bridge portion which relays a session by which a sequence of packets are transmitted and received between terminals connected with each other via a network;

b) a socket information table which has socket information containing address information of one of said terminals and protocol information used in said session, said socket information being associated with information on whether or not said session is to be terminated; and
c) a service information table which has information on a communication service to be provided for each service provision unit being identified based on predetermined information within a header of said packet, wherein said bridge portion terminates said session, dividing said session into two TCP sessions between terminals and the session relay equipment, and executes a communication service based on said information contained in said header of said packet and said socket information, and wherein the bridge portion terminate session protocol includes sending ACK (Acknowledge) packets of the transport protocol.

* * * * *